United States Patent [19]
Farrell et al.

[11] Patent Number: 5,678,969
[45] Date of Patent: Oct. 21, 1997

[54] AIR BAG HAVING INFLATION INDICATOR AND METHOD OF DETERMINING PROPER SPACING BETWEEN LOADS SUPPORTED THEREBY

[75] Inventors: William J. Farrell, Lake Forest, Ill.; Thomas C. Keenan, Brentwood; Gregory S. King, Mount Pleasant, both of Tenn.

[73] Assignee: Illinois Tool Works Inc., Glenview, Ill.

[21] Appl. No.: 522,691

[22] Filed: Sep. 1, 1995

[51] Int. Cl.$^6$ ................................. B61D 45/00
[52] U.S. Cl. ............................ 410/119; 410/125
[58] Field of Search ...................... 410/31, 36, 38, 410/39, 40, 42, 117, 118, 119, 124, 125; 40/326, 412, 477; 73/700, 729.1, 729.2, 730, 731

[56] References Cited

U.S. PATENT DOCUMENTS

| | | | |
|---|---|---|---|
| 2,990,070 | 6/1961 | Cushman | 410/119 |
| 3,142,917 | 8/1964 | Spender | 73/700 |
| 3,546,944 | 12/1970 | Mack | 73/731 |
| 3,960,281 | 6/1976 | Reeves | 214/10.5 D |
| 4,136,788 | 1/1979 | Robbins | . |
| 4,553,887 | 11/1985 | Reeves | 410/119 |
| 4,591,519 | 5/1986 | Liebel | 428/35 |
| 5,056,558 | 10/1991 | Rodgers | 410/119 |
| 5,255,670 | 10/1993 | Lomholt | 73/731 |
| 5,263,801 | 11/1993 | Keenan et al. | 410/119 |
| 5,431,515 | 7/1995 | Sansone et al. | 410/119 |

Primary Examiner—Karen B. Merritt
Assistant Examiner—Gregory A. Morse
Attorney, Agent, or Firm—Schwartz & Weinrieb

[57] ABSTRACT

The present invention presents an air bag, and a method of using the same, which has at least one indicator line marking thereon for providing a visual indication of when the air bag is in a properly inflated condition for filling a void between loads, such as cargo or the like, in a truck, airplane, train or the like. Each indicator line includes a center portion which is of a first design, such as being blue-colored, and having easily identifiable ends. Preferably, each indicator line has end portions of a second design, such as being red-colored, which are on opposite sides of the center portion of the line and which are visually distinct from the first design. The center portion of the indicator line has a length which is substantially equal to the maximum thickness of the air bag. The air bag is properly inflated when the end portions of the line are not visible, or the center portion of the line marking is completely visible between the loads and the junctions between the center portion and the end portions of the line marking are just visible between the loads. When inflated to the latter, the air bag is also inflated to its maximum pressure. In a second embodiment, the indicator lines extend vertically from the top seam to the bottom seam of the air bag. The air bag is properly inflated when the inner edges of the lines are visible between the loads.

24 Claims, 2 Drawing Sheets

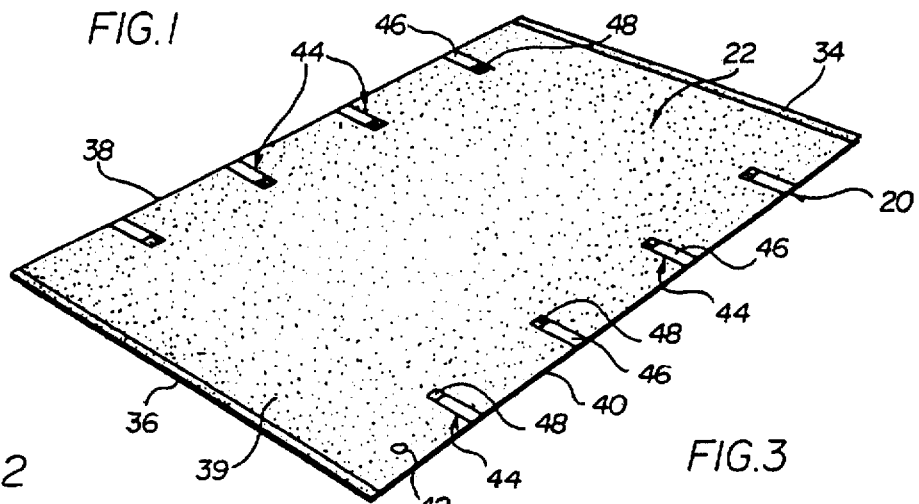
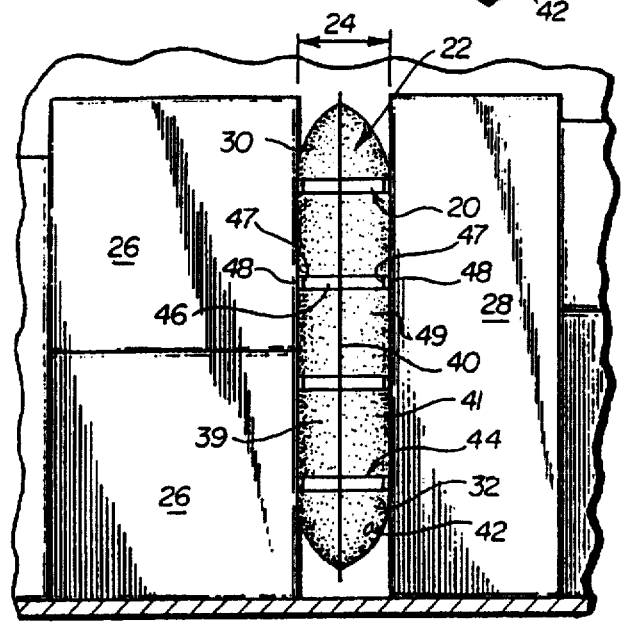
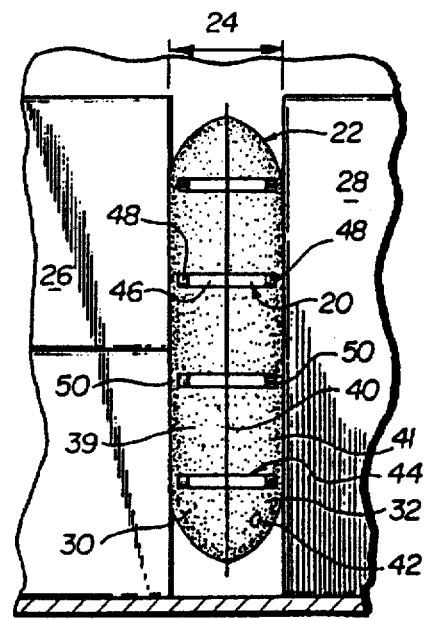
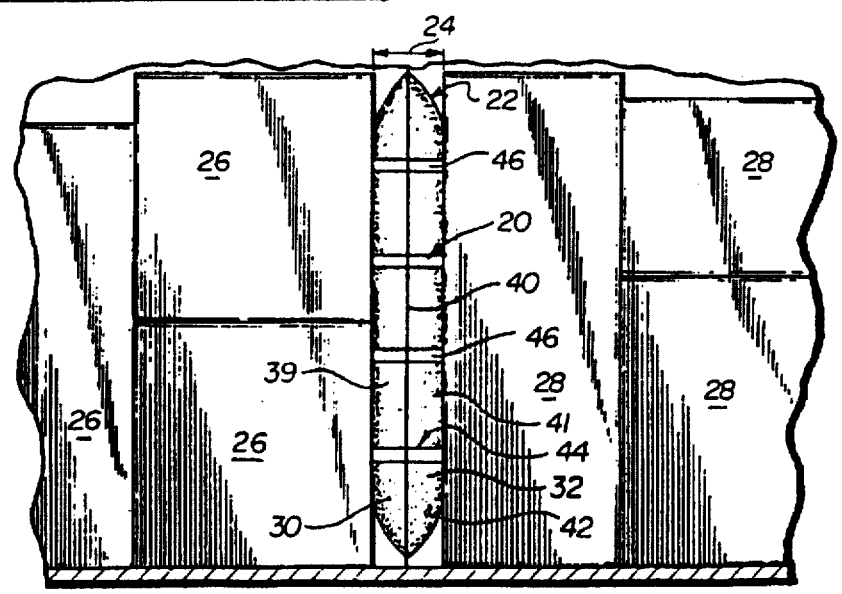

AIR BAG HAVING INFLATION INDICATOR AND METHOD OF DETERMINING PROPER SPACING BETWEEN LOADS SUPPORTED THEREBY

FIELD OF THE INVENTION

This invention is directed to an indicator on a cargo air bag that visually indicates to a user whether the air bag is properly inflated and is placed in a void between loads that is of a proper size.

BACKGROUND OF THE INVENTION

It is well-known in the art to use inflatable air bags for buffering a load, such as cargo boxes and the like, in a transport vehicle, such as a train, ship, truck, aircraft and the like, in order to brace the load from shifting or damaging itself during transport because of voids between the loads. These air bags typically consist of a plastic, inflatable bladder surrounded by some form of container, usually a multi-ply paper container. The container prevents the bladder from being punctured by the load or other objects in the cargo bay. The air bag includes an air inlet valve so that the bladder can be inflated.

When using this type of air bag, the air bag is placed between the loads in a deflated condition and then inflated through the valve with high pressure air to a desired air pressure, usually two to eight pounds per square inch, depending of the size of the bladder and the container structure. In the inflated condition, the voids between the loads are filled and the loads are stabilized and ready for transport.

A proper air bag should be placed between the loads in order to properly stabilize and buffer the loads. Often, the void between the loads in which the air bag is placed is too large for the air bag that is used. As a result, the air bag is commonly over-inflated so that the void is completely filled and the air bag ruptures.

The present invention presents a novel indicator that easily allows a user to visually know that the air bag is inflated to a proper thickness, and thus pressure, and that a proper air bag is being used for the specific void to be filled. Other advantages and features will become apparent upon a reading of the following disclosure.

OBJECTS OF THE INVENTION

A general object of the present invention is to provide a novel indicator for an air bag that is used as a brace between loads in a transport vehicle and which easily and visually indicates to a user that the air bag is in a properly inflated condition.

An object of the present invention is to provide a novel air bag having an indicator which easily and visually indicates to a user that the air bag is in an over-inflated condition.

SUMMARY OF THE INVENTION

Briefly, and in accordance with the foregoing, the present invention comprises an air bag, and a method of using the same, which has at least one indicator line marking thereon for providing a visual indication of when the air bag is in a properly inflated condition for filling a void between loads, such as cargo or the like, in a truck, airplane, train or the like. In accordance with a first embodiment of the present invention, each indicator line includes a center portion which is of a first design, such as being blue-colored, and having easily identifiable ends. Preferably, each indicator line has end portions of a second design, such as being red-colored, which are on opposite sides of the center portion of the line and are distinct from the first design. The center portion of the indicator line has a length which is equal to the maximum thickness and, thus pressure, to which the air bag is to be inflated while maintaining a properly inflated condition. The air bag is properly inflated when the air bag is inflated but the end portions of the line cannot be seen or when the center portion of the line is completely visible between the loads and the junctions between the center portion and the end portions of the line are just visible between the loads.

In accordance with a second embodiment of the present invention, each indicator line is vertical with respect to the floor when the air bag is placed between loads and inflated. Each indicator line extends the entire length of the air bag and has a predetermined width. The width between the indicator lines is equal to the thickness to which the air bag is to be inflated so as to obtain a properly inflated condition of the air bag. The air bag is properly inflated when the inner vertical edges of the indicator lines are just visible between the loads.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements throughout the several views, and in which:

FIG. 1 is a perspective view of an air bag in a deflated condition which incorporates the features of a first embodiment of the invention;

FIG. 2 is a side elevational view of the air bag shown in FIG. 1 in a properly inflated condition, but maximum inflated condition, to fully fill a void between two pieces of cargo;

FIG. 3 is a side elevational view of the air bag shown in FIG. 1 in an over-inflated condition in a void between two pieces of cargo which is too large for the air bag to properly fill the void;

FIG. 4 is a side elevational view of the air bag shown in FIG. 1 in a properly inflated condition in a void between two pieces of cargo which is smaller than the void shown in FIG. 2;

DETAILED DESCRIPTION OF THE ILLUSTRATED EMBODIMENTS

Figure 5:
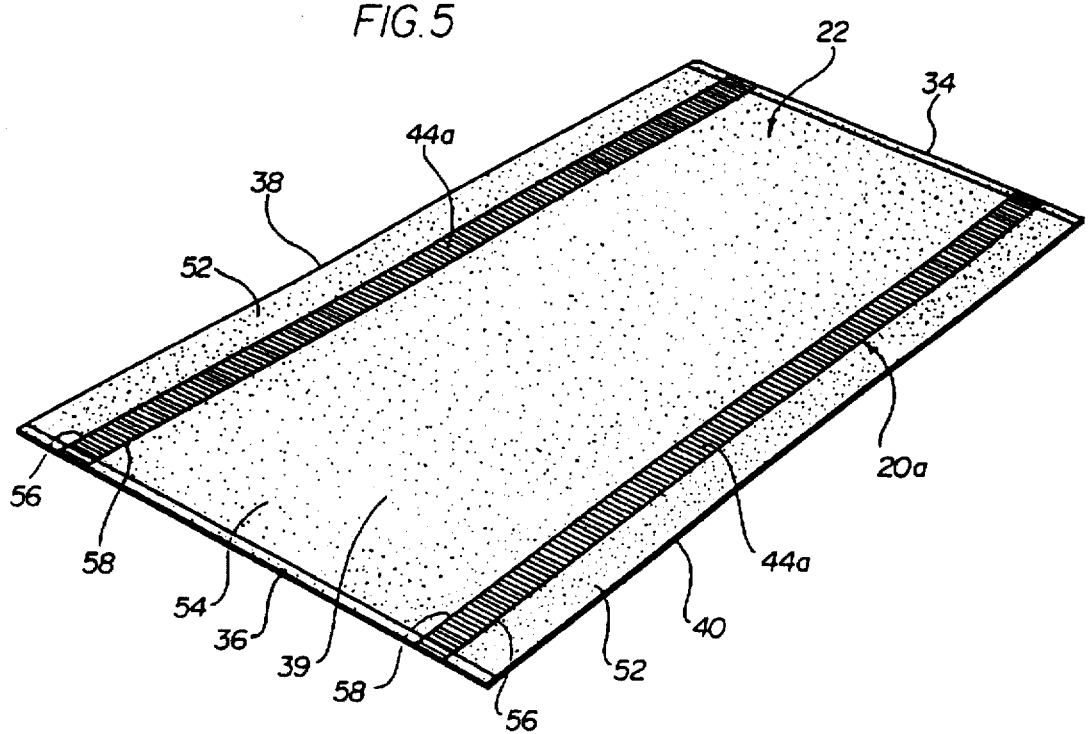
FIG. 5 is a perspective view of an air bag in a deflated condition which incorporates the features of a second embodiment of the present invention.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The present invention presents a novel indicator 20 which visually and easily indicates to a user whether the air bag 22 is properly inflated within a space or void 24 between pieces of cargo items or loads 26, 28 that the air bag 22 is designed to properly fill. The air bag 22 is particularly suited for use to hold and stabilize various large objects, such as cargo or loads 26, 28, during transport by filling the void 24 left between the loads 26, 28 when the loads are placed side-by-side in the transport vehicle. The air bag 22 of the present invention is generally formed of a bladder which is sealed within and surrounded by a container or bag.

The bladder may be made of a seamless tube of polyethylene, rubber or the like and is sealed so as to be gas-tight. The bladder includes a valve 42 for inflating the bladder by high pressure air from an appropriate source to a desired air pressure, usually 2 to 8 pounds per square inch, depending on the size and the container structure of the air bag 22.

The container in which the bladder is enclosed is of known construction such as the multi-ply dunnage bag disclosed in U.S. Pat. No. 4,136,788, whose disclosure is incorporated herein by reference. The container is formed of two sheets 30, 32, each of which is comprised of multiple layers of suitable sheet material such as paper, usually 4 to 8 plies. The sheets 30, 32 are joined at the edges of the sheets 30, 32 along top seam, 34, bottom seam 36 and side seams 38, 40 by suitable means. Alternatively, a single sheet of material can be folded over onto itself and sealed along the overlapping edges by suitable means so that only a single side seam is provided. The container prevents the bladder from being punctured by the load 26, 28 or by other objects which may be found in a cargo bay.

The novel indicator 20 of the present invention which is provided on the air bag 22 is formed of at least one marking 44, which in its preferred embodiment is an elongate line as shown in the drawings, which overlaps Onto each sheet 30, 32 of the container and over the side seam 38 or 40. The midpoint of the marking line 44 substantially coincides with the side seam 38 or 40. As shown, a plurality of markings 44 are provided on the air bag 22, more specifically upon each side of the air bag 22 with each marking 44 overlapping onto each sheet 30, 32 over the respective side seam 38, 40, however, only a single marking may be used if desired. The markings 44 provide a user with a visual indication as to whether the air bag 22 is in a properly inflated condition and thus, the void 24 in which the air bag 22 is placed is one that the particular air bag 22 should be used in.

Each marking 44 has a first indicia portion 46 which has a first design thereon. The length of the first indicia portion 46 is substantially equal to the maximum thickness, and thus maximum pressure, to which the air bag 22 is to be inflated to properly fill the void 24. In addition, the length of the first indicia portion 46 represents the maximum width of the space which can be properly filled by the air bag 22. The design is such that opposite ends 47 of the first indicia portion 46 are easily observed when the air bag 22 is inflated to its maximum thickness, and thus pressure, to properly fill the void 24 as described below. In order to define the opposite ends 47 of the first indicia 46, there is preferably provided a second indicia along end portions 48 which have a second design and are positioned on each side of the first indicia portion 46. The first design and the second design are visually distinct from each other so that a person can easily visually distinguish between the two designs. Preferably, the first design, of which the first indicia portion 46 is formed, is a color, such as the color blue and the second design, of which the end portions 48 are formed, is another distinct color, such as the color red. Of course, the designs can be any design that is desired, such as a solid black line as the portion 46, and a series of black checks as the end portions 48, so long as the designs are distinct from each other so that a user can tell the difference between the designs. The markings 44 can be applied to the air bag 22 by suitable means, such as by printing the markings on the air bag 22. The end portions 48 may be short in length or can extend around the periphery of the air bag 22 to the indicator line marking 44 on the opposite side of the air bag 22 if desired.

When the air bag 22 is being used to buffer and stabilize the loads 26, 28, the air bag 22 is placed in the void 24 between the loads 26, 28 in a deflated condition with the sheets 30, 32 adjacent to the loads 26, 28 so that the side seams 38, 40 with the markings 44 thereon are clearly visible to a user. The user then inflates the air bag 22 by injecting high pressure air from an appropriate source through the valve 42 and into the bladder in the air bag 22. The size of the air bag 22 used is dependent on the size of the void 24 to be filled.

As air is introduced into the air bag 22, the air bag 22 expands and the length of the marking 44 becomes visible to the user. As shown in FIG. 2, the maximum thickness, and thus pressure, to which the air bag 22 should be inflated to properly fill the void 24 is indicated when the junctures between the opposite ends 47 of indicia 46 and portions 48 of the indicator line markings 44 are just visible to the user.

As shown in FIG. 3, when the void 24 between the loads 26, 28 to be supported by the air bag 22 is too wide, the end portions 48 of the indicator line markings 44 are substantially visible to the user when the air bag 22 is inflated. If the end portions 48 are shorter in length, then portions 50 of the air bag 22 beyond the end portions 48 of the indicator markings 44 may be seen. This tells the user that the air bag 22 is over-inflated and since air bags have a maximum operating pressure, if the air bag gets too far over-inflated, then the air bag may rupture.

As shown in FIG. 4, when the void 24 between the loads 26, 28 to be supported by the air bag 22 is narrow, the entire indictor line marking 44 will not be visible to the user and the end portions 48 of the markings 44 will be completely hidden from view when the air bag 22 is inflated. While the air bag 22 is not inflated to its maximum pressure and thickness, as shown in FIG. 2, the air bag 22 still provides a proper buffer between the loads 26, 28 to properly fill the void 24 even though the air bag 22 is under-inflated and the full capacity of the air bag 22 is not being used.

After the air bag 22 has been used, the air bag 22 may be disposed of, or deflated by appropriate means for reuse.

Figure 6:
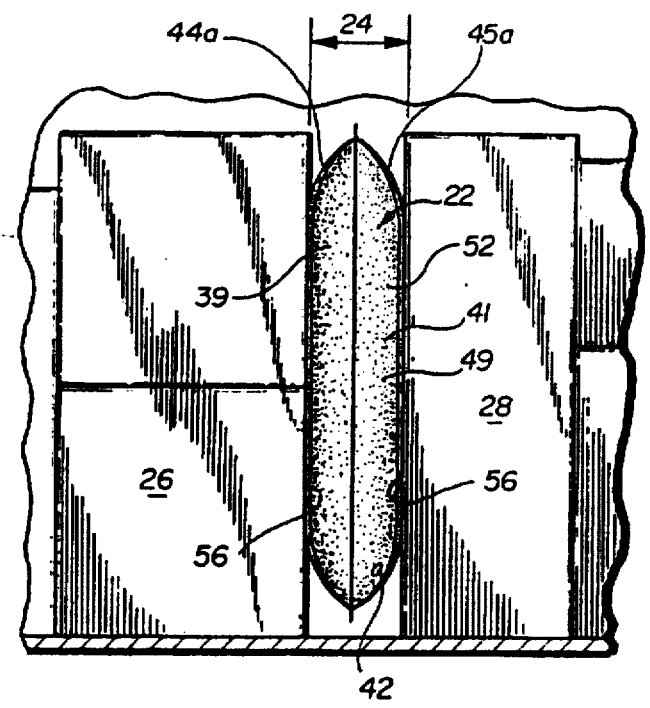
FIG. 6 is a side elevational view of the air bag shown in FIG. 5 in a properly inflated condition so as to properly and fully fill a void between two pieces of cargo.
Figure 7:
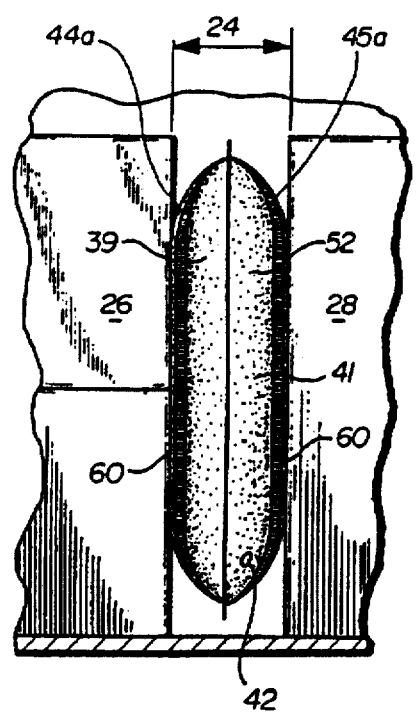
FIG. 7 is a side elevational view of the air bag shown in FIG. 5 in an over-inflated condition in a void between two pieces of cargo which is too large for the air bag to properly fill the void.

Attention is now directed to the second embodiment of the novel indicator 20a of the present invention as shown in FIGS. 5–7. The indicator 20a is formed of at least two markings 44a, 45a on the air bag 22, each of which in its preferred embodiment comprises a pair of elongate lines. Each marking 44a, 45a is disposed upon a single face 39, 41 of the air bag 22 and extends substantially the entire length of each face 39, 41 of the air bag 22 from the top seam 34 to the bottom seam 36 and is of a predetermined width such that an inner end 56 and an outer end 58 of each marking line 44a, 45a is defined. The inner end 56 of each marking line 44a, 45a is spaced from the side seam, for example, side seam 40, by means of a distance which is substantially equal to one-half of the maximum thickness to which the air bag 22 is to be inflated so as to properly fill the void 24. Thus, the distance defined between the inner ends 56 of the marking lines 44a, 45a represents the maximum thickness to which the air bag 22 is to be inflated so as to properly fill the void 24, or in other words, the maximum width of the space which can be properly filled by the air bag 22. The markings 44a, 45a thus provide a user with a visual indication as to whether or not the air bag 22 is in a properly inflated condition, or alternatively, whether or not the void 24 in which the air bag 22 is placed is of the proper size within which the particular air bag 22 is to be used.

As was the case of the first embodiment, it is to be understood that the marking lines 44a, 45a do not need to be solid along their length. Instead, the lines 44a, 45a can be a series of spaced apart dots, checks, or the like, along the length of each line Each marking line 44a, 45a comprises an indicia which has a design thereon. The design on each marking line 44a, 45a is visually distinct from the remainder of the air bag 22 so that a person can easily visually distinguish between the marking lines 44a, 45a and the remainder of the air bag 22. Preferably, the design on each of the marking lines 44a, 45a is a first color, while the reminder of the air bag 22 is of a second design which may be another distinct color. Of course, as was the case in the first embodiment, the designs can be any design that may be desired as long as the designs are visually distinct from each other so that a user can easily tell the difference between the designs. The marking lines 44a, 45a can be applied to the air bag 22 by any suitable means, such as, for example, by printing the marking lines 44a, 45a on the air bag 22.

The area 52 between the inner ends 56 of the marking lines 44a, 45a may have an indicia thereon which has a design that is different from the marking lines 44a, 45a and which are clearly distinguishable from the marking lines 44a, 45a. In addition, the area 54 between the outer ends 58 of the marking lines 44a or 45a, which are on the same face of the air bag 22, may have an indicia thereon which has a design that is different from the marking lines 44a, 45a and which are clearly distinguishable from the marking lines 44a, 45a.

When the air bag 22 is being used to buffer and stabilize the loads 26, 28, the air bag 22 is placed in the void 24 between the loads 26, 28 in a deflated condition with the faces 39, 41 disposed adjacent to the loads 26, 28 so that the side seams 38, 40 are clearly visible to a user. When the air bag 22 is placed between the loads 26, 28, the markings 44a, 45a are vertical and perpendicular to the floor upon which the loads 26, 28 are supported, and the user cannot see the marking lines 44a, 45a since the marking lines 44a, 45a are disposed toward or face the loads 26, 28. The user then inflates the air bag 22 by injecting high pressure air into the bag 22 from an appropriate source and through the valve 42 and the bladder of the bag 22. The size of the air bag 22 used is dependent upon the size of the void 24 to be filled.

As air is introduced into the air bag 22, the air bag 22 expands and the faces 39, 41 of the air bag 22 move into engagement with the respective loads 26, 28. Eventually, after a sufficient amount of air is introduced into the air bag 22, the vertical marking lines 44a, 45a become visible to the user. As shown in FIG. 6, the maximum thickness to which the air bag 22 should be inflated so as to properly fill the void 24 is indicated when the inner ends 56 of the indicator line markings 44a, 45a are just visible to the user. In other words, the distance between the inner ends 56 of the indicator line markings 44a, 45a defines a marginal end portion 49 of the air bag 22, which end portion 49 in turn defines the desired thickness of the inflated air bag 22 and the size of the void or space 24 defined between the loads 26 and 28 when the air bag 22 is properly inflated.

As shown in FIG. 7, when the void 24 defined between the loads 26, 28 is too wide, the entire marking lines 44a, 45a are visible to a user and a portion 60 of each area 54 of the air bag 22 is visible to the user when the air bag 22 is inflated. This tells the user that the air bag 22 is over-inflated and if the air bag 22 is over-inflated further, the air bag 22 may rupture. After the air bag 22 has been used, the air bag 22 may be disposed of or deflated by appropriate means for reuse.

Obviously, many modifications and variations of the present invention are possible in light of the above teachings. It is therefore to be understood that within the scope of the appended claims, the present invention may be practiced otherise than as specifically described herein.

The invention claimed is:

1. An air bag for filling a void defined between opposed surfaces, comprising:

an inflatable container having opposite sides for engaging said opposed surfaces when said container is inflated, and end portions extending across said void from one of said opposed surfaces to the other one of said opposed surfaces; and visual indicating means disposed upon said end portions of said inflatable container for disposition within said void so as to provide visual indication directly upon said end portions of said inflatable container as to when said inflatable container is properly inflated.

2. An air bag as set forth in claim 1, wherein:

said visual indicating means comprises at least one indicator disposed upon each one of said opposite sides of said container wherein said indicators disposed upon said opposite sides of said container are spaced from each other, as measured across a side edge portion of said container, a predetermined distance which is of a length which is approximately equal to the thickness of said inflatable container when said inflatable container is properly inflated.

3. An air bag as set forth in claim 2, wherein:

said at least one indicator disposed upon each one of said opposite sides of said container comprises a plurality of indicators spaced from each other so as to be disposed along opposite side edge portions of said each one of said opposite sides of said inflatable container.

4. An air bag as set forth in claim 2, wherein:

said at least one indicator comprises a first indicia comprising a first design, and a second indicia comprising a second design which is visually distinct from said first indicia.

5. An air bag as set forth in claim 4, wherein:

said inflatable container is inflated to a properly inflated condition when said first indicia is visible between said opposed surfaces.

6. An air bag as set forth in claim 4, wherein:

said inflatable container is inflated to a properly inflated condition when said second indicia just becomes visible between said opposed surfaces.

7. An air bag as set forth in claim 4, wherein:

said inflatable container is inflated to an improper over-inflated condition when portions of said inflatable container beyond said second indicia of said at least one indicator are visible between said opposed surfaces.

8. An air bag as set forth in claim 4, wherein:

said at least one indicator disposed upon each one of said opposite sides of said inflatable container is disposed within the vicinity of said side edge portion of said inflatable container and comprises an elongate line which extends across said side edge portion of said inflatable container from one of said opposite sides of said inflatable container to the other one of said opposite sides of said inflatable container.

9. An air bag as set forth in claim 8, wherein:

said first indicia comprising said first design comprises a first color along a center portion of said elongate line, said second indicia comprising said second design comprises a second color disposed at end portions of said elongate line, and said first and second colors are visually distinct from each other.

10. An air bag as set forth in claim 8, wherein:

said opposed surfaces comprise portions of cargo loads which are disposed upon a support surface; and said elongate line is disposed parallel to said support surface when said inflatable container is interposed between said cargo loads disposed upon said support surface.

11. An air bag as set forth in claim 1, wherein:

said inflatable container comprises a top and a bottom; and said visual indicating means comprises at least one elongate line which extends from said top of said inflatable container to said bottom of said inflatable container.

12. An air bag as set forth in claim 11, wherein:

said at least one elongate line comprises one elongate line disposed upon each one of said opposite sides of said inflatable container within the vicinity of a side edge portion of said inflatable container extending between said top and bottom of said inflatable container such that when said inflatable container is properly inflated, the distance defined between said elongate lines disposed upon said opposite sides of said inflatable container and measured across said side edge portion of said container will be substantially equal to the thickness of said inflatable container when said inflatable container is properly inflated.

13. An air bag as set forth in claim 12, wherein:

said opposed surfaces comprise portions of cargo loads which are disposed upon a support surface; and said elongate lines are disposed perpendicular to said support surface when said inflatable container is interposed between said cargo loads disposed upon said support surface.

14. An air bag as set forth in claim 12, wherein:

said inflatable container is inflated to a properly inflated condition when said elongate lines are just visible between said opposed cargo loads.

15. An air bag as set forth in claim 12, wherein:

said inflatable container is inflated to an improper overinflated condition when portions of said container beyond said elongate lines are visible between said opposed cargo loads.

16. An air bag as set forth in claim 1, wherein:

said visual indicating means disposed upon said end portions of said inflatable container comprises printed indicia.

17. An air bag as set forth in claim 16, wherein:

said visual indicating means comprising said printed indicia comprises a predetermined design which is visually distinct from the remainder of said inflatable container.

18. A method of visually determining the proper spacing between loads to be supported by an air bag, comprising the steps of:

providing an air bag having opposite sides for engaging opposed surfaces of spaced cargo loads when said air bag is inserted between said cargo loads and inflated, the air bag also having end portions extending across the space defined between said spaced cargo loads and interconnecting said opposite sides of said air bag;

providing visual indicating means upon said end portions of said air bag such that said visual indicating means will be disposed within said space defined between said spaced cargo loads and thereby provide visual indication directly upon said end portions of said air bag as to when said air bag is in a properly inflated condition;

spacing said cargo loads with respect to each other so as to define said space therebetween within which said air bag is to be inserted;

inserting said air bag into said space, defined between said spaced cargo loads, when said air bag is in a deflated condition; and inflating said air bag until said visual indicating means disposed upon said end portions of said air bag provides visual indication directly upon said end portions of said air bag that said air bag has been inflated to a properly inflated condition.

19. The method as set forth in claim 18, wherein the step of providing said visual indicating means comprises the step of:

providing said visual indicating means as at least one indicator mark upon each one of said opposite sides of said air bag wherein said indicator marks comprise a design which is visually distinct from the remainder of said container and are spaced from each other, as measured across a side edge portion of said air bag, a predetermined distance which is of a length which is approximately equal to the thickness of said air bag when said air bag is in a properly inflated condition and which is also substantially equal to the extent of said space defined between said cargo loads.

20. The method as set forth in claim 18, wherein the step of providing said indicator marks upon said air bag comprises the step of:

providing said indicator marks as horizontally separated line portions.

21. The method as set forth in claim 19, wherein the step of providing said indicator marks upon said air bag comprises the step of:

providing said indicator marks as horizontally spaced vertically extending lines.

22. An air bag for filling a void defined between opposed surfaces, comprising:

an inflatable container having opposite sides for engaging said opposed surfaces when said container is interposed between said opposed surfaces and inflated, and end portions interconnecting said opposite sides of said inflatable container and extending across said void defined between said opposed surfaces; and visual indicating means disposed upon said inflatable container wherein said visual indicating means is not visible when said inflatable container is not properly inflated and is visible when said inflatable container is properly inflated.

23. An air bag as set forth in claim 22, wherein:

said visual indicating means comprises horizontally spaced portions, of at least one horizontally extending line, disposed upon said opposite sides of said inflatable container.

24. An air bag as set forth in claim 22, wherein:

said visual indicating means comprises a pair of horizontally spaced vertically extending lines respectively disposed upon said opposite sides of said inflatable container.

* * * * *